United States Patent
Würmlin et al.

(10) Patent No.: US 9,406,131 B2
(45) Date of Patent: Aug. 2, 2016

(54) METHOD AND SYSTEM FOR GENERATING A 3D REPRESENTATION OF A DYNAMICALLY CHANGING 3D SCENE

(75) Inventors: Stephan Würmlin, Zurich (CH); Christoph Niederberger, Basel (CH)

(73) Assignee: LIBEROVISION AG, Zurich (CH)

( * ) Notice: Subject to any disclaimer, the term of this patent is extended or adjusted under 35 U.S.C. 154(b) by 1201 days.

(21) Appl. No.: 12/302,928

(22) PCT Filed: May 24, 2007

(86) PCT No.: PCT/CH2007/000265
§ 371 (c)(1),
(2), (4) Date: Jan. 7, 2009

(87) PCT Pub. No.: WO2007/140638
PCT Pub. Date: Dec. 13, 2007

(65) Prior Publication Data
US 2009/0315978 A1 Dec. 24, 2009

(30) Foreign Application Priority Data
Jun. 2, 2006 (EP) .................................. 06405248

(51) Int. Cl.
*G06T 7/20* (2006.01)
*G06T 7/00* (2006.01)
(Continued)

(52) U.S. Cl.
CPC ................. *G06T 7/002* (2013.01); *G06T 5/005* (2013.01); *G06T 7/0075* (2013.01); *G06T 7/20* (2013.01);
(Continued)

(58) Field of Classification Search
CPC ......... G06T 7/002; G06T 7/0075; G06T 7/20; G06T 7/2093; G06T 7/2086; G06T 7/0065; G06T 7/004–7/0046; G06T 15/04; G06T 15/205; A63B 2024/0025
USPC ........ 348/47, 48, 94, 139, 157, 159; 345/419, 345/679
See application file for complete search history.

(56) References Cited

U.S. PATENT DOCUMENTS 5,513,854 A * 5/1996 Daver .............................. 700/91
5,729,471 A * 3/1998 Jain et al. ...................... 725/131
(Continued)

FOREIGN PATENT DOCUMENTS

| EP | 1 465 115 A2 | 10/2004 |
| JP | 2002-518722 | 6/2002 |
| WO | 99/65223 | 12/1999 |

OTHER PUBLICATIONS

Xu, M. et al.; "Architecture and algorithms for tracking football players with multiple cameras"; IEE Proceedings—Visions, Image and Signal Processing IEE; United Kingdom; vol. 152, No. 2; Apr. 8, 2005; pp. 232-241; XP006023772.
(Continued)

Primary Examiner — Gregory Todd
(74) Attorney, Agent, or Firm — Rankin, Hill & Clark LLP

(57) ABSTRACT

A method for generating a 3D representation of a dynamically changing 3D scene, which includes the steps of:
acquiring at least two synchronised video streams (120) from at least two cameras located at different locations and observing the same 3D scene (102);
determining camera parameters, which comprise the orientation and zoom setting, for the at least two cameras (103);
tracking the movement of objects (310*a,b*, 312*a,b*; 330*a,b*, 331*a,b*, 332*a,b*; 410*a,b*, 411*a,b*; 430*a,b*, 431*a,b*; 420*a,b*, 421*a,b*) in the at least two video streams (104);
determining the identity of the objects in the at least two video streams (105);
determining the 3D position of the objects by combining the information from the at least two video streams (106);
wherein the step of tracking (104) the movement of objects in the at least two video streams uses position information derived from the 3D position of the objects in one or more earlier instants in time.
As a result, the quality, speed and robustness of the 2D tracking in the video streams is improved.

27 Claims, 6 Drawing Sheets

(51) Int. Cl.
*G06T 15/20* (2011.01)
*A63B 24/00* (2006.01)
*G06T 5/00* (2006.01)

(52) U.S. Cl.
CPC ............. *G06T 7/2086* (2013.01); *G06T 7/2093* (2013.01); *G06T 15/205* (2013.01); *A63B 2024/0025* (2013.01); *G06T 2200/08* (2013.01); *G06T 2207/30221* (2013.01); *G06T 2207/30241* (2013.01)

(56) References Cited

U.S. PATENT DOCUMENTS

| | | | | |
|---|---|---|---|---|
| 6,124,862 | A | * | 9/2000 | Boyken et al. ................ 345/419 |
| 6,359,647 | B1 | * | 3/2002 | Sengupta et al. ............. 348/154 |
| 6,724,421 | B1 | * | 4/2004 | Glatt ............................ 348/154 |
| 8,051,453 | B2 | * | 11/2011 | Arseneau et al. ............... 725/94 |
| 2003/0031253 | A1 | | 2/2003 | Itokawa |
| 2005/0018045 | A1 | * | 1/2005 | Thomas et al. ................ 348/157 |
| 2006/0120592 | A1 | | 6/2006 | Park |
| 2007/0216769 | A1 | * | 9/2007 | Zganec et al. ................ 348/139 |
| 2007/0279494 | A1 | * | 12/2007 | Aman et al. ................... 348/169 |
| 2008/0129824 | A1 | * | 6/2008 | Loveless ....................... 348/157 |
| 2009/0046152 | A1 | * | 2/2009 | Aman ............................. 348/157 |
| 2009/0315978 | A1 | * | 12/2009 | Wurmlin et al. ................ 348/43 |

OTHER PUBLICATIONS

Dockstader, Shiloh L. et al.; "Multiple Camera Tracking of Interacting and Occluded Human Motion"; Proceedings of the IEEE; IEEE, New York, New York; vol. 89, No. 10; Oct. 2001; pp. 1441-1455; XP011044563.

Bebie, T. et al.; "A Video-Based 3D-Reconstruction of Soccer Games"; Computer Graphics Forum Blackwell Publishers for Eurographics Assoc., United Kingdom; vol. 19, No. 3; 2000; pp. C391-C400; XP008015195.

Saito, Hideo et al.; "Sports Scene Analysis and Visualization from Multiple-View Video"; IEEE International Conference on Multimedia and Expo (ICME); IEEE International Conference on Taipei, Taiwan Jun. 27-30; Piscataway, New Jersey; vol. 2; Jun. 27, 2004; pp. 1395-1398; XP010771178.

Misu, Toshihiko et al.; "Robust Tracking of Athletes Using Multiple Features of Multiple Views"; Journal of WSCG, Vaclav Skala-Union Agency; Pilzen, Czech Republic; vol. 12, No. 1-3; Feb. 2, 2004; pp. 285-292; XP002331013.

Koyama; Takayoshi et al.; "Live Mixed-Reality 3D Video in Soccer Stadium"; Proceedings of the Second IEEE and ACM INternational Symposium on Mixed and Augmented Reality; Oct. 7-10, 2003; Piscataway, New Jersey; pp. 178-187; XP010662809.

Inamoto, Naho et al.; "Immersive Observation of Virtualized Soccer Match at Real Stadium Model"; Proceedings of the Second IEEE and ACM International Symposium on Mixed and Augmented Reality; Oct. 7-10, 2003; Piscataway, New Jersey; pp. 188-197; XP010662810.

Hayashi, Kunihiko et al.; "Synthesizing Free-Viewpoint Images From Multiple View Videos in Soccer Stadium"; Proceedings of the International Conference on Computer Graphics, Imaging and Visualisation; International Conference on Sydney,I Australia Jul. 26-28, 2006; Piscataway, New Jersey, Jul. 26, 2006; pp. 220-225; XP010934327.

Drori, Iddo et al.; "Fragment-Based Image Completion"; ACM Transactions on Graphics; vol. 22, No. 3; Jul. 2003; pp. 303-312; XP002444998.

Rander, Peter et al, Virtualized Reality: Constructing Time-Varying Virtual Worlds From Real World Events; New York, NY, Oct. 24, 1997.

Zhang, Yunjun et al, Motion Layer Based Object Removal in Videos; Breckenridge, CO, USA, IEEE, Los Alamitos, CA, USA; Jan. 1, 2005.

Shiratori, Takaaki et al., Video Completion by Motion Field Transfer; New York, NY; Jun. 17, 2006.

European Search Report filed in EP 12002185.

* cited by examiner

METHOD AND SYSTEM FOR GENERATING A 3D REPRESENTATION OF A DYNAMICALLY CHANGING 3D SCENE

BACKGROUND OF THE INVENTION

1. Field of the Invention

The invention relates to the field of video processing and virtual image generation, and is applicable to e.g. television sports coverage by video based reconstruction of game situations in three dimensions. It relates to a method and a system for generating a 3D representation of a dynamically changing 3D scene as described in the preamble of the corresponding independent claims.

2. Description of Related Art

The paper "A Video-Based 3D-Reconstruction of Soccer Games", T. Bebie and H. Bieri, EUROGRAPHICS 2000, Vol. 19 (2000), No. 3, describes a reconstruction system designed to generate animated, virtual 3D (three dimensional) views from two synchronous video sequences of part of a soccer game. In order to create a 3D reconstruction of a given scene, the following steps are executed: 1) Camera parameters of all frames of both sequences are computed (camera calibration). 2) The playground texture is extracted from the video sequences. 3) Trajectories of the ball and the players' heads are computed after manually specifying their image positions in a few key frames. 4) Player textures are extracted automatically from video. 5) The shapes of colliding or occluding players are separated automatically. 6) For visualization, player shapes are texture-mapped onto appropriately placed rectangles in virtual space. It is assumed that the cameras remain in the same position throughout the video sequence being processed.

EP 1 465 115 A2 describes the generation of a desired view from a selected viewpoint. Scene images are obtained from several cameras with different viewpoints. Selected objects are identified in at least one image, and an estimate of the position of the selected objects is determined. Given a desired viewpoint, positions of the selected objects in the resulting desired view are determined, and views of the selected objects are rendered using image date from the cameras.

Further reference is made to the following prior art publications:

"Architecture and algorithms for tracking football players with multiple cameras". M. Xu, J. Orwell and D. Thirde; IEE Proceedings—Vision, Image, and Signal Processing—April 2005—Volume 152, Issue 2, p. 232-241. This paper describes the extraction of the position of football players and the 3D-position of a ball, given video images from static cameras. however, the synthesis of a 3D representation is not addressed.

"Multiple camera tracking of interacting and occluded human motion". Dockstader, S. and Tekalp, A. M.; 2001a. Proceedings of the IEEE 89, 1441-1455. This paper is directed to tracking multiple moving and interacting persons, given multiple camera images. The synthesis of a 3D representation and the calibration of camera location and/or orientation is not addressed.

"Sports scene analysis and visualization from multiple-view video". Hideo Saito, Naho Inamoto, Sachiko Iwase; Int. Conf Multimedia and Expo (ICME) 2004: 1395-1398. This paper describes a free-viewpoint visualisation of a soccer scene from multiple camera views.

"Robust Tracking of Athletes Using Multiple Features of Multiple Views". Toshihiko Misu, Seiichi Gohshi, Yoshinori Izumi, Yoshihiro Fujita, Masahide Naemura; Proceedings of WSCG '2004. pp. 285-292. In order to track moving objects in 2D images, a number of plug-ins is used to observe multiple features such as texture, colour, motion and region, and the information from the separate plugins is then fused, weighting the information adaptively according to a reliability measure provided by each plug-in.

"Live mixed-reality 3D video in soccer stadium". Koyama, T. Kitahara, I. Ohta, Y.; Mixed and Augmented Reality, 2003. The Second IEEE and ACM International Symposium on mixed and augmented reality (ISMAR); 7-10 Oct. 2003; page(s): 178-186. A simplified 3D-Model is reconstructed from multiple video images, and selected video information is projected onto the model. A dedicated camera, installed vertically above the playing field, is required to determine player position. Laser surveying instruments are required to calibrate the positions of the other cameras.

"Immersive Observation of Virtualized Soccer Match at Real Stadium Model". Naho Inamoto, Hideo Saito; The Second IEEE and ACM International Symposium on mixed and augmented reality (ISMAR); 7-10 Oct. 2003; pages 188-197. A virtual soccer scene representation is generated from real images, and displayed to a person wearing a head mounted device (HMD).

BRIEF SUMMARY OF THE INVENTION

It is an object of the invention to create a method and a system for generating a 3D representation of a dynamically changing 3D scene of the type mentioned initially, which provides an improvement over known systems. In this context, the representation to be generated is understood to be itself a 3D-representation, i.e. model of the scene that comprises information about the 3D position and orientation of the modeled objects. This is in contrast to 2D representations, in which a 2D image is manipulated and analyzed, e.g. identifying objects and by tracking the movement of one or more objects, without determining the 3D position of the object.

These objects are achieved by a method and a system for generating a 3D representation of a dynamically changing 3D scene according to the corresponding independent claims.

The method for generating a 3D representation of a dynamically changing 3D scene, comprises the steps of:
- acquiring at least two, preferably synchronised video streams from at least two cameras located at different locations and observing the same 3D scene;
- determining camera parameters, which comprise the position, orientation and internal parameters such as e.g. zoom setting, for the at least two cameras;
- tracking the movement of objects in the at least two video streams;
- determining the identity of the objects in the at least two video streams;
- determining the 3D position of the objects by combining the information from the at least two video streams;

wherein at least one of the steps listed above relies on information derived from the at least two video streams by one of the subsequent steps.

As a result, an information feedback loop is implemented, that is, a particular step in the sequence of information processing steps uses information gained in one or more subsequent steps of the process. This information typically is derived from video information that was generated at an earlier instant in time. Such a use of a priori information improves the quality and reliability of the results of said particular step. In a preferred embodiment of the invention, the 3D position of at least one object is extrapolated from at least two earlier 3D positions of the object.

In a preferred embodiment of the invention, the step of tracking the movement of objects in the at least two video streams uses information that is derived in one of the subsequent steps from the at least two video streams and stems from one or more earlier instants in time.

In a further preferred embodiment of the invention, the information derived from the one or more earlier instants in time is the 3D position of the object.

As a result, the quality and robustness of the 2D tracking in the video streams is improved. According to the state of the art, the tracking in a video stream is only based on the information available from the video stream itself. This leads to ambiguities when two objects collide or overlap in one of the video streams. Given a 3D position of an object and a camera calibration information, the movement of the object's projection in the image space can be predicted more precisely using backprojection of the object's 3D position into the image. Furthermore, it is possible to disambiguate between different interpretations of the same image. By projecting the object's 3D position back into the image, the tracking algorithm can detect colliding/overlapping objects and keep the correct identification after both objects separate again.

In a preferred variant of the invention, the 3D position of at least one object is extrapolated from at least two earlier 3D positions of the object. This is done e.g. by a first or higher order interpolation of the past trajectory of the object over the last few image frames. The term "objects" here and forthwith refers to moving objects of interest in the scene being observed by the camera. In a sports setting, objects are e.g. players, a ball and a referee. Other key image elements are the background, which is essentially stationary, and which on the one hand may comprise the pitch or playing field, characteristic features such as lines and other marks on the pitch, walls and a environment (e.g. stadium) surrounding the pitch. If required, they shall be referred to as "background objects". Spectators in the environment, although in motion, are not considered to be "moving objects" for the purpose of this application. In general "2D" refers to positions or shapes of objects or features in a video image, whereas "3D positions" refer to the position of an object in a three-dimensional computational model of the scene. In a preferred embodiment of the invention, such a 3D model is maintained and updated dynamically. Video image or texture information from the various video feeds is rendered on surfaces defined by this 3D model. This allows to synthesize arbitrary, dynamic views of the 3D model, generating additional synthetic or virtual video feeds.

Here and in the remainder of the application, the term "rendering" is understood to mean, as is usual in computer graphics, the process of producing the pixels of an image from a higher-level description of its components. In this case, the higher-level description is the combination of the 3D model and its associated texture information, and the rendering is achieved by mapping the texture information onto the 3D model and determining what a virtual camera sees in the 3D model.

In a preferred variant of the invention, the camera calibration is based on the tracking of reference features. In order to initialize the tracking process, it is necessary to identify, in each of the video feeds, a number of reference features, i.e. by associating each of them by a unique identifier. Each reference feature is associated with a feature of the scene (e.g. position, line, corner, circle, etc.) in 3D space. Given these features and the projection of the reference features as seen in the video images, camera parameters, and in particular the position, orientation and zoom setting and possibly further optical parameters of the camera, are determined. The entire set of these parameters shall henceforth be referred to as "camera parameters". The step of determining these parameters is called camera calibration and is typically performed for every frame of every video feed that is processed. In order to do this, the movement of the reference features within each video stream may be tracked by an appropriate tracking method and system as known in the art.

In a preferred variant of the invention, an expected image position of the reference feature in one of the video images is computed from the known 3D location of the reference feature. This is particularly useful when, after moving or zooming the view, a reference feature that was not visible for a while becomes visible again. From the 3D model and given the current camera parameters, it is determined that a particular reference feature (with known identity) should be visible at an expected position in the current frame. The vicinity of the expected position is examined by feature extraction, and a feature found in the image (and preferably being of the same type as the expected reference feature) is automatically assigned the identity of the expected reference feature.

In a preferred variant of the invention, the calibration is achieved on the basis of the video images alone. The step of camera calibration may alternatively be accomplished by determining the position, orientation and zoom setting of the camera by (electro)mechanical measurement means, or by extracting corresponding values from a control system that controls these parameters.

In a further preferred variant of the invention, for each of the video streams, the reference features are assigned their identity in a reference image. In a typical sports setting, reference features are lines and other marks on the pitch. They are identified in a video still image by a user
- pointing, with a graphical input device, to a representation of the same reference feature in a schematic representation of the pitch, and selecting the representation of the reference feature;
- pointing, with a graphical input device, to a particular reference feature as seen in the video still image, and selecting the reference feature; and
- associating the identity of the representation of the reference feature with the reference feature seen in the still image.

The action of selecting a representation or feature is effected by a user command or input such as e.g. clicking a mouse key or hitting a predetermined key after pointing to the representation or feature. The order of selecting the reference feature (first or second) and its schematic representation (second or first) may be varied. The representation of the reference feature and the video image may be displayed on separate screens or within separate windows on the same screen. This method for initialising the association between image features and model features allows for a quick setup of the system.

In another preferred variant of the invention, in the step of selecting the reference feature in the video still image, the following substeps are performed for determining the exact position of the reference feature in the video still image:
- automatically performing, in the vicinity of the position selected by the user, a feature extraction and in particular an extraction of lines, intersections and corners;
- determining the position of the reference feature as being the position of one of the features extracted, and in particular of a feature whose type is the same as that selected in the schematic representation of the pitch.

This allows to automatically "snap" the selection to the best position of the feature, as determined from the video frame. This corrects for small positioning errors made by the user when pointing to the feature, and so simplifies and accelerates the initialization process.

In yet a further preferred embodiment of the invention, the step of tracking the movement of objects comprises the step of incorporating dynamically changing camera parameters in the tracking function such that the tracking function compensates for changes in the camera parameters. This means that for each step of locating a particular tracked object, not only its expected position and preferably also its size based on the position and preferably also its size in earlier frames are computed, but the expected position and size are corrected according to the known changes of the camera settings, including zooming between the preceding and the present video frame. Correction signifies that the movement of the camera (panning and tilting) is used to determine the expected change of position in the image while the amount of zooming has an influence on the expected size of the object. This leads to a more precise prediction for the tracking algorithm which increases the processing time of the whole tracking method.

The camera parameters taken into account in the compensation or correction step of the tracking function are either:
  camera parameters determined by a camera calibration step performed for the same video frame for which the tracking is done, or are
  camera parameters determined by a camera calibration step performed for one or more previous video frames.

In the former case, the tracking step has to wait for the completion of the camera calibration, in the latter case, the tracking and calibration steps can be performed in parallel. In the latter case, the camera parameters optionally may be extrapolated, e.g. by linear or higher order interpolation from two or more earlier sets of camera parameters.

In a further preferred variant of the invention, for initialising object identifications, the following steps are performed:
  a user selecting, in a first still image, of a first one of the video streams, one object and assigning it a unique identifier; and
  automatically determining, in a further still image of at least one further video stream, an object whose identity is the same.

This "automatic identification assistance" reduces the work of identifying each object in each of the set of still images (one for each video stream, and under the precondition that all images are taken at the same time). Identifying an object in an image means that an object, as seen in an image, is associated with being "referee" or "ball" or "player Vroomfondel" or another player etc. Ideally, identifying an object can be done by clicking on (or otherwise selecting) an object in only one of the still images. Assuming that all objects are located at the level of the playing field, the 3D position of the selected object on the playing field is determined by intersecting the vector pointing from the camera to the object position as seen by the camera with the plane of the playing field. When not assuming that the objects are located at the level of the ground, the 3D point closest to all the said vectors can be calculated as the object position. From this position, the expected position in the other video stills is computed. For each of the other video stills, if an object is at the expected position, then its identity is set to be the same as that of the object in the first still image. The system preferably displays the further still image incorporating a visual representation of said identity and allows the user to confirm or reject the association with said identity. Cases in which objects overlap in one or more still images can sometimes be detected automatically, e.g. if a total area, shape or colour histogram etc. is not as expected. In such cases, the user is informed and the identity of the object in the respective image is set manually. In other cases, it may be necessary to identify the object in another frame from the same video stream, in which other frame the object is easier to separate from other objects.

The situation may occur, in which an object, typically a player, is not visible on any of the video feeds and thus is no longer tracked. As a result, when the object reappears in one of the video streams, its identity is not known anymore. In this case, the system performs the steps of:
  alerting the user to the presence of an unidentified moving object; and
  permitting the user to associate an identifier with the object.

The step of detecting a moving object includes detecting the presence of significant motion between frames (compensating for changes in camera parameters, as outlined above), discounting objects that are already being tracked, the remaining areas of motion may correspond to a re-entering object. After a predetermined threshold regarding object size and e.g. matching criteria with a statistical model of the set of known objects is exceeded, the presence of the object is indicated to the user.

In another preferred variant of the invention, it is not necessary to keep the complete identity of an object, that is, it is not important to know that object X represents "player Vroomfondel". It is sufficient to know that the object is of a particular category, e.g. a player of team A, which may be determined automatically from the object colours, or simply a player. For this setting, an unidentified moving object is preferably automatically associated with a unique identifier generated by the system. This allows generation of a continuous 3D reconstruction and representation without manual intervention.

In the course of motion tracking, objects are commonly associated with "bounding boxes", which are rectangular pixel areas in which the object is known or expected to lie. In a more general sense, a bounding box may be replaced by a silhouette of different shape around the object. Bounding boxes (or silhouettes) are preferably generated by tracking and refined by the later segmentation step, as explained below.

Alternatively, in a further preferred embodiment of the invention, one or more overview cameras are positioned to always cover the entire playing field. They do not move and do not zoom. The view from these cameras allows tracking of all objects, as long as they do not leave the field, and eliminates the need to identify objects whose identity has been lost. This camera may be a lower cost camera than the cameras used for generating TV images that are ultimately broadcast.

The step of locating the position of the moving objects may also be accomplished or aided by incorporating one or more RF (radio frequency) transponders in the objects and measuring their positions with a RF locating system. Thus, the object's identity and position are known precisely at each moment of time.

In a preferred variant of the invention, the objects are categorised as belonging to one of at least two categories. The categories preferably are based on a statistical model such as a Gaussian mixture model and including at least two of first team, second team, first team goalkeeper, second team goalkeeper, ball and referee. The parameters incorporated by the statistical model preferably are the colour(s) of the objects. It is e.g. known that Team A is dressed with a first set of colours, Team B in a second set, the goalkeepers of the teams have different colours than both teams, and the referee is predominantly black or another color, and the background green, white and a variety of other colours (colour of grass, markings, goal posts and spectators). Thus, the image is segmented not only by separating objects from background, but the objects are classified into different sets. The statistical model is preferably generated from a still image from one camera, and then applied to the video streams of all cameras. The statistical model is generated by, for each category of objects, the user moving, by means of a pointing device, a reference mark along a path over a variety of points that belong to said category. The colours of the points on said path form a sample representing said category in the generation of the statistical model.

When segmenting the video frames in each of the video feeds, the separation of the objects from the background and the distinction from one another preferably comprises the step of:

using alpha channel matching to assign, to each picture element or pixel, a value that expresses the probability with which the pixel is part of an object or part of the background.

Such a value is known as an Alpha value, and is stored e.g. as alpha channel information associated with the image or stream. As a result, there are not hard (binary) boundaries around objects, which improves the quality of later rendering steps in which the object images are combined and/or mapped onto a 3D surface.

In a further preferred embodiment of the invention, the segmentation step comprises, after cutting out the objects from the background, filling corresponding holes left in the background by image inpainting, see for example "View Interpolation for Image Synthesis", Chen and Williams, ACM SIGGRAPH 1993, pp. 279-288. Such inpainted picture elements are marked as being synthetic image data. This is done by setting a corresponding bit for each inpainted pixel in the filled-in image, or by associating the video feed with a further channel comprising the marking information. This additional information allows, at a later time in the inventive method, to disregard synthetic image data for picture elements for which real image data is available.

Please note that terms like "synthetic view", "image synthesis", etc.—as opposed to "synthetic image data"—refer to something different, namely to the virtual images or virtual views of a 3D scene that are generated according to the invention, and which are based on both real image data and synthetic image data.

Thus, "real image data" related to a surface location or surface patch in the 3D scene typically is image information from one or more video streams that comes from observing this patch at the instant of time that is represented. In contrast, "synthetic image data" is image information generated by e.g.:

inpainting by 2D techniques, such as filling a hole, starting at the boundary, with colours or patterns found at the boundary;

using image data coming from the same surface patch but obtained from a video stream at another instant of time;

using image data coming from the same surface patch but obtained from another video stream (at the same or at another instant of time);

using image data obtained from a video stream at the same instant of time but coming from another surface patch;

inpainting by 3D techniques, such as filling a hole with patterns of the scene surrounding the hole while considering the 3D location of the surface patches being filled and used for filling.

Preferred ways for generating synthetic (background) image data, which typically combines aspects of the last two points, are now presented. Such 3D-inpainting uses not only image patches from the vicinity of a hole to fill the hole, but also takes into account knowledge about the spatial (i.e. 3D) relationships between surface patches. That is, when using image data from a "source patch" to fill in image data at a "destination patch", then the spatial relation between these patches, which may involve rotation and/or a different perspective, is considered.

The goal is to fill in the holes with colours or textures that resemble the actual expected image as closely as possible. A known approach is to choose a destination patch that extends over the boundary of a hole, and thus includes known and unknown parts of the image. A search is then performed to find a source patch, with a part of the source patch matching the known parts. The remaining part of the source patch is then used to fill the unknown parts by copying. However, this searching and copying only takes place in the plane of a video image.

According to the invention, the known position and/or orientation of the source and destination patches in 3D space is used when searching for source patches and when copying source image data to a destination patch.

In a further preferred embodiment of the invention, information about the location of landmarks is used to guide the inpainting. Landmarks are characteristic, immobile background features, typically linearly extended features such as straight or circular lines on the playing field, whose nominal location is known. This approach preferably incorporates knowledge from a field model including the location and orientation of the lines on the playing field. Preferably, this is combined with the 3D information about the location of patches along the landmark.

For example, one or more of the following approaches are implemented:

If a destination patch includes a part of a landmark, then source patches are searched for along the landmark, and are mapped onto locations inside the hole at which the landmark is expected to be;

If a destination patch lies on a circle, then the destination patch is transformed (e.g. rotated and scaled, typically without preserving its aspect ratio) before it is compared to a potential source patch along the circle, or vice versa. Likewise, the source patch is transformed when it is copied to the destination patch.

If a destination patch lies along a straight line, then the destination patch is scaled (typically preserving its aspect ratio) before it is compared to a more distant— from the point of view of the camera—potential source patch along the line. Likewise, the source patch is scaled back when it is copied to the destination patch.

The inpainting is preferably performed individually for several video streams, resulting in a set of video streams showing the same background scene, without the (moving) objects from different perspectives. At a later point of processing, these inpainted background images are used to colour or "paint" the 3D background model. However, in another embodiment of the invention, the inpainting takes place when the 3D background model is coloured: the background model is first coloured according to the background image information from one or more video streams, and then any remaining uncoloured patches on the 3D model are painted in a similar manner as described above, i.e. with image information from other locations or instants in time.

The above described hole filling method may be implemented independently of the other aspects of the invention described herein, in particular independently of the steps of 3D object tracking and identification, camera calibration etc. . . .

Preferably, the segmentation step includes the step of refining the position and dimensions of the bounding boxes. This means that bounding boxes around objects, as they are output by the object tracking, are adapted according to the segmentation information: This makes sense since the quality of standard tracking algorithms is limited in that the boundary boxes they create around moving objects often tend to lag behind the actual object position or tend to increase in size. Therefore, the bounding box is adapted to contain the object after the image segmentation. The position of the object, which preferably is defined as being the lower middle (or, alternatively, a predetermined one of the corners of the bounding box) is in consequence adapted as well.

In a preferred variant of the invention, a synthesised view is provided which shows the scene from a virtual viewpoint that is distinct from the positions of the real cameras. This includes the steps of:
  providing camera parameters of a virtual camera;
  determining a background image as seen by the virtual camera;
  determining a projection of each of the objects into the virtual camera and superimposing it on the background image.
  outputting or storing the combined image for storage or for further processing.

As a result, a global 3D representation of the entire scene is maintained and updated dynamically, based on input from the video streams. Video or image information from the video streams is rendered on the 3D representation, allowing to generate images from viewpoints that differ from the actual physical locations of the cameras providing the source video feeds. This is in contrast to the prior art, where only isolated rectangles are placed in 3D space and images are texture-mapped onto these rectangles, but without consideration of the pitch and the remaining background objects.

Here and in the remainder of the application, the term "texture" stands for image or picture data from the surface of a real (or, alternatively, from a computer generated) object. The texture data is e.g. observed by one or more cameras or is retrieved from a database, and can be transformed geometrically and be rendered by mapping it onto the surface of an object in the 3D model.

In a further preferred variant of the invention, the step of determining a background image as seen by the virtual camera comprises the steps of
  blending, for each background picture element, image information from the different video streams that correspond to the same background location;
  giving priority to image information that is not marked as being synthetic image data; and
  rendering the image information on a background model including one or more surfaces representing the background, that is, background objects.

As a result, whenever real image data is available, the background, is coloured with a blend of colours from the available real data, since the real data is given priority over the synthetic data. Only when no real data is available is the background in the 3D model coloured with synthetic data from one or more of the backgrounds from the different video feeds after segmentation.

In a preferred variant of the invention, the surface representing the background is a surface representing the playing field or pitch, and optionally also includes surfaces representing an environment model, stored e.g. in an environment data module. The environment model may be a simple generic model that is applied to any environment, or a environment model derived from CAD data of the actual environment. In another preferred variant of the invention, the step of determining a background image as seen by the virtual camera further comprises rendering predetermined image data on the background model, superimposing it over or replacing the image information provided by the video streams.

In another preferred variant of the invention, the step of determining a projection of each of the objects into the virtual camera includes the steps of determining the position and orientation of a rendering object, and then rendering the video information extracted from the different video feeds and associated with this object onto the rendering object.

In one preferred embodiment of the invention, the rendering object is a so-called billboard, that is, a vertical plane standing on the pitch. The size and orientation of the billboard is determined in accordance with the bounding box for this object from one of the video feeds. The location of the billboard is defined by the calculated 3D position of the object described earlier. The 3D position is then combined with the projection of the bounding box to produce four 3D vertices of a three-dimensional rectangle. To this end, the normal of the rectangle is equal to the optical axis, or view plane normal defined either by the real camera from which the bounding box originated, or by the virtual camera. In the former case, multiple billboards may be used for each object, each corresponding to a real camera. The final rendered image is composed of a combination of the images rendered onto these multiple billboards. The combination is controlled depending on the location of the virtual camera.

In another preferred variant of the invention, the billboards are augmented with a height field defining the coarse geometry of the object. That is, height fields are determined from two or more real camera views by for example shape-from-silhouettes or shape-from-stereo methods, as described e.g. in "Multiple View Geometry in Computer Vision", Richard Hartley and Andrew Zisserman, Cambridge University Press, 2000. These height fields are then preferably used to improve the final quality of the object rendering. The billboards can also be augmented using displacement-maps representing finer details of the object geometry. The latter is useful for faster rendering.

In a further preferred variant of the invention, the superposition into the virtual camera of the projection of the objects and the background image is performed by means of alpha blending. The values in the alpha channels of the object billboards are either directly used or further weighted based on angle similarity, resolution or field-of-view between the optical characteristics of the real cameras and virtual camera.
  The methods for
  using a representation of a reference feature in a schematic representation of the pitch for identifying reference features;
  snapping the position of a reference feature to the position of one of the features extracted in the reference feature identification process;
  tracking compensation and correction according to changing camera parameters;
  automatic identification assistance;
  alerting the user to the presence of an unidentified object;
  categorising image elements as being part of the background or of one of at least two object categories;
  using alpha channel matching;
  marking inpainted picture elements as being synthetic image data;

inpainting by 3D techniques;
refining the position and dimensions of bounding boxes around the objects based on the results of segmentation;
rendering video information onto a 3D background model;
may each, in principle, also be implemented in a system that does not incorporate the tracking of the movement of objects in the at least two video streams by using position information derived from the 3D position of the objects.

The system, according to the invention, includes a data acquisition module provided with video streams from a producing entity, and further includes a camera calibration module, a 2D tracking module, an object identification module, a 3D merging and 3D object position calculation module, and preferably an object cutout module and an image synthesis module which provides video data to a consumer.

A computer program product for generating a 3D representation of a dynamically changing 3D scene according to the invention is loadable into an internal memory of a digital computer, and includes computer program code means to make, when the computer program code means is loaded in the computer, the computer execute the method according to the invention. In a preferred embodiment of the invention, the computer program product includes a computer readable medium, having the computer program code means recorded thereon.

Further preferred embodiments are evident from the dependent patent claims. Features of the method claims may be combined with features of the system claims and vice versa.

BRIEF DESCRIPTION OF THE DRAWINGS

The subject matter of the invention will be explained in more detail in the following text with reference to preferred exemplary embodiments which are illustrated in the attached drawings, in which:

FIG. 8 schematically shows images with a hole to be filled and a hole with a landmark passing through;

The reference symbols used in the drawings, and their meanings, are listed in summary form in the list of reference symbols. In principle, identical parts are provided with the same reference symbols in the figures.

DETAILED DESCRIPTION OF THE INVENTION

Figure 1:
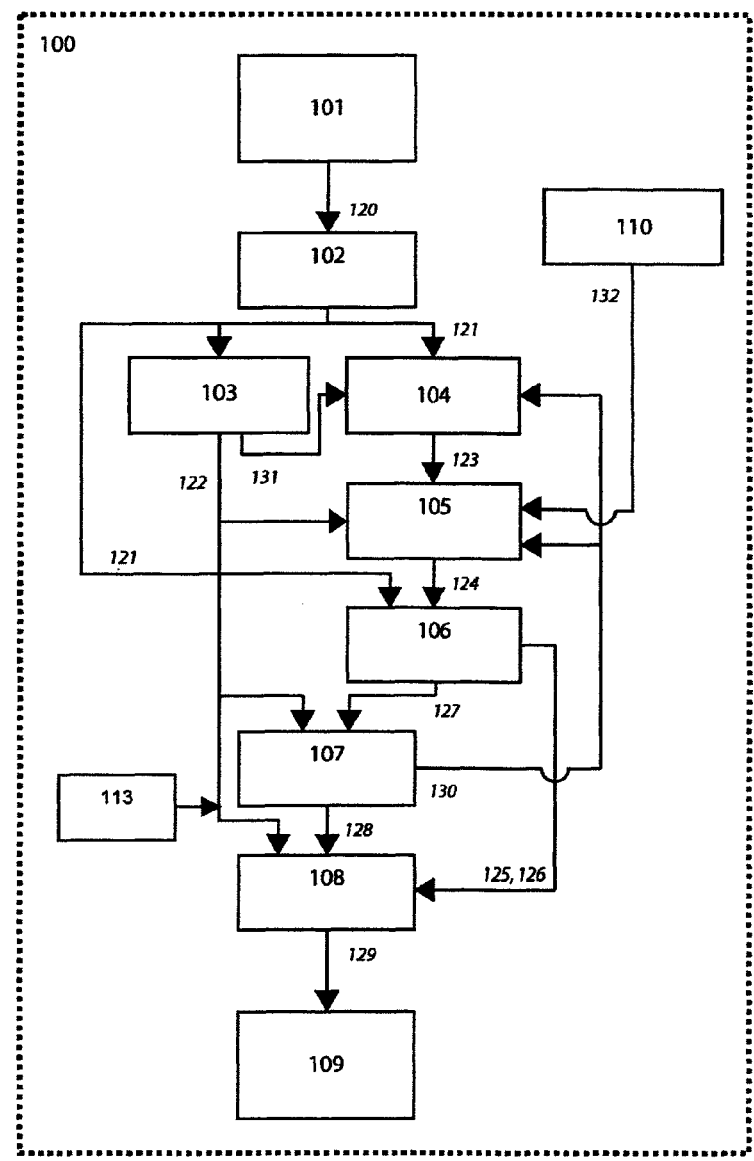
FIG. 1 schematically shows an overview of structure of a system and method according to the invention.

FIG. 1 schematically shows an overview of a system 100 and corresponding method with system components and corresponding submethods. The components are linked by interfaces, i.e. data in- and outputs. The figure thus on the one hand shows the components or modules and the main data flow between these modules. On the other hand, the modules correspond to method steps of the method implemented by the system. Therefore, the modules will also be referred to as methods, depending on the context.

The system 100 and its components may be implemented by software modules and/or dedicated hardware modules, depending on the actual processing requirements of the individual components. Thus, the system 100 may be implemented on a general purpose data processing device or computer comprising a processing unit, a data storage unit and input/output devices such as a display, keyboard, pointing device, and data communication interfaces.

The system comprises a data acquisition module 102 provided with video streams from a producing entity 101, and further comprises a camera calibration module 103, a 2D tracking module 104, an object identification module 105, an object cutout module 106, a 3D merging and 3D object position calculation module 107, and an image synthesis module 108 which provides video data to a consumer 109. The system 100 may further comprise or be linked to a resource data module 110 and an environment data module 113. The different types of data flowing through the interfaces between the modules are listed in the list of designations.

In FIG. 1, the sequence from top to bottom shows the forward direction of information processing (with the camera calibration step 103 preceding the 2D tracking step 104, and every other step preceding the steps shown below it). Thus, a step is considered to be a subsequent step of any step that precedes it in the order shown. The arrow emanating from the 3D object position calculation 107 denotes 3D object position 130 that is provided to preceding steps such as the 2D tracking module 104 and/or the object identification module 105. Thus, the 3D object position 130 constitutes a feedback of information, flowing against the commonly implemented direction of information processing.

The invention, in a preferred embodiment, works in the following manner:

Two or more video streams 120 are produced 101 and provided in real-time to the system 100. Usually, the input is provided via hardware cables and the data therein in the SDI (Serial Digital Interface) format, a system which is commonly used by TV producers on production site for video transportation. The format or hardware is not essential to the invention and can differ in other embodiments.

In a first step, a data acquisition method 102 uses a preferably off-the-shelf hardware component which captures (digitizes) these two or more video streams 120 into a computer's internal memory. This method can additionally convert the format of the data into RGB or YUV or another image representation format for further processing. Additionally, an optional step of this method comprises a de-interlacing method using standard methods, see "De-Interlacing: A Key Technology for Scan Rate Conversion", Bellars and De Haan, Elsevier, 2000. The output of method 102 is digitized color texture data 121 of all incoming video streams for all frames.

Figure 2:
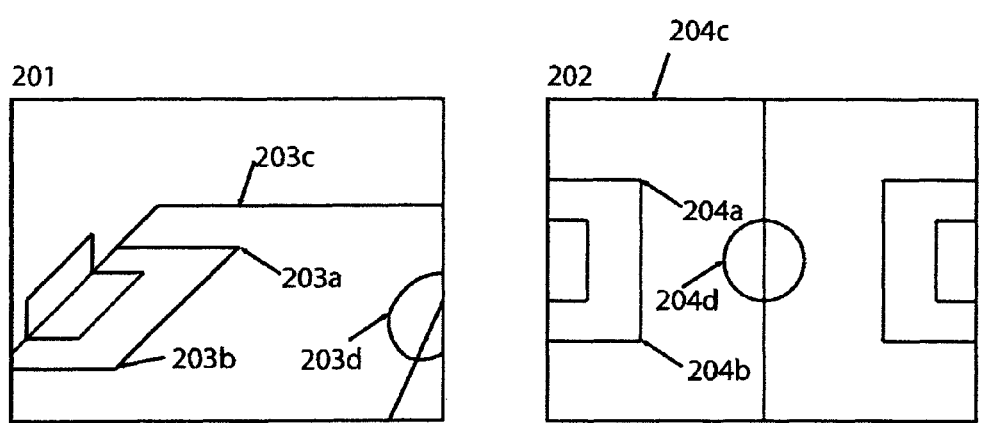
FIG. 2 schematically shows images used in the user interaction phase of the calibration method.

Then, the camera calibration method 103 is used to determine each camera's position, orientation and internal parameters 122 which is used in other methods. FIG. 2 shows a schematic view of the user interaction used to initialize or to correct, in case of failure, the calibration method. In the frame of each video input corresponding to an initialization time (e.g. t_init), the user identifies features which can be exact 2D locations 203a, b, lines 203c, circles 203d or other known features. This process is assisted by a "snapping" method which identifies image features such as lines or circles using known methods, as can be obtained for example from the "open source computer vision library" at http://www.intel.com/technology/computing/opencv/.

When the user input device (mouse pointer) is near such a feature, it "snaps" to said feature by changing its position onto the feature in the image. After having selected (by clicking, pressing a key, etc) the feature 203*a-d* in the video image 201, the user selects the corresponding feature 204*a-d* in the schematic view 202. After having selected some features 203*a-d* and their corresponding schematic representation 204*a-d*, a calibration calculation algorithm, for example as in "A flexible new technique for camera calibration", Z. Zhang, *IEEE Transactions on Pattern Analysis and Machine Intelligence*, 22(11):1330-1334, 2000, calculates the position, orientation, and internal parameters of the camera for this very frame, known as the calibration information. These steps are carried out for each camera's initialization frame at time t_init.

For subsequent frames (at time t(k)=t_init+1, t_init+2, . . . ) and for each video stream, the calibration method automatically tracks the identified features in the 2D image using a tracking algorithm, for example "Condensation—conditional density propagation for visual tracking", Isard and Blake, International Journal of Computer Vision, 29, 1, 5-28, 1998.

In parallel, or following the calibration method 103, the tracking method 104 uses the digitized color texture data 121, camera calibration data of the actual and/or (depending on whether it is parallel or not) previous steps 131 and the extrapolated 3D object position 131 to determine the 2D position and shape 123 of all visible objects in each set of color texture data 121.

In the initialization frame at t_init, the user preferably specifies the location of objects in each video image of all cameras. An automatic method can be used to propose candidates for this process. In one preferred embodiment of the method, the user specifies a 2D rectangle, a so-called bounding box 501, using the mouse input device and/or the keyboard. This rectangle 501 can be changed pixelwise in position 509 and size (width 510 and height 511) using the mouse and/or the keyboard at any later time. In another preferred embodiment, the user clicks/points onto each object and an automated method determines the bounding box 501 or another indication of the shape (semi)automatically. This can be done using a similar method as the one used in the refinement method of object cutout method 106, described further below.

For further frames, the tracking method operates automatically. Basically, applicable (also real-time) tracking methods, for example "Condensation—conditional density propagation for visual tracking", Isard and Blake, International Journal of Computer Vision, 29, 1, 5-28, 1998, work as follows:
1. Extrapolate the object's 2D state in the image based on previous states.
2. Search the surrounding of this extrapolated 2D position by comparing the search sample's features with the features of the object. Such a sample feature comparison can be based on a color-histogram, a Gaussian mixture model, or similar models ("Pattern Classification", Duda, Hart, and Stork, Wiley Interscience, 2000).
3. Select one or more of the search samples as the current state.

Figure 3:
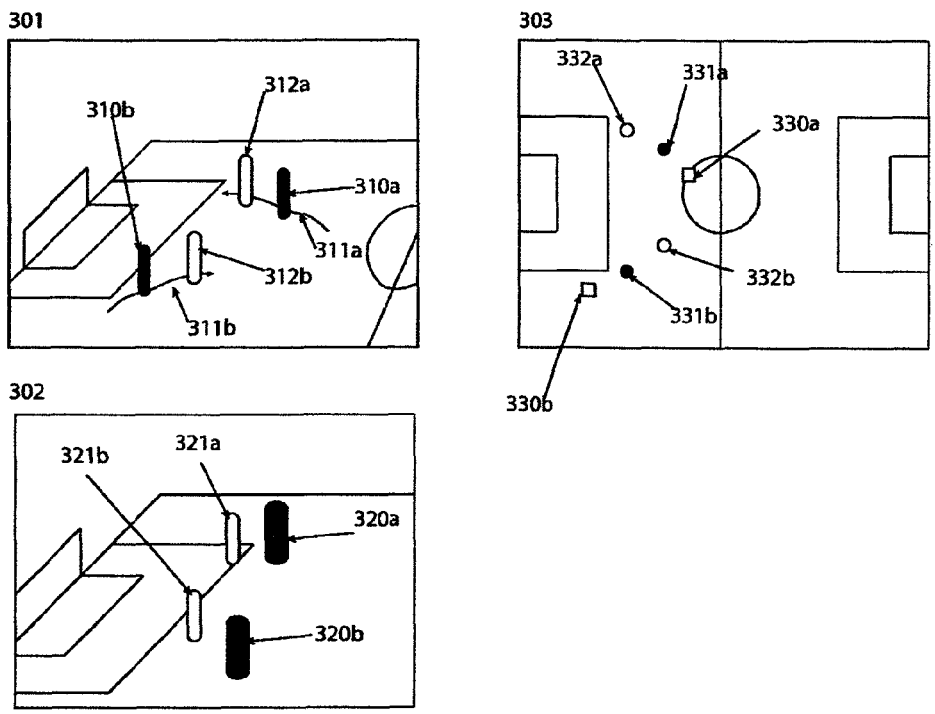
FIG. 3 schematically shows images illustrating the tracking method.

FIG. 3 schematically shows our improved tracking method described herein. From the 3D object position calculation method 107, the calibration method 103 gets the extrapolated 3D object position of all objects. This extrapolation is done in the 3D model of the scene 303, where, for example, the 3D position from the previous frame 331*a,b* and from the frame before the previous frame 330*a,b* are used to extrapolate the 3D object position at the current frame 332*a,b* based on a linear or higher order interpolation scheme.

Note that FIG. 3 does not represent a single video frame, but shows the position of objects 310*a,b*, 312*a,b* . . . superimposed from two different frames for the purpose of explanation. A real video stream would show, in a first frame, the objects 310*a* and 310*b*, and in a later frame, the objects 311*a*, 311*b*. The objects correspond, in an actual video frame, to image segments determined by tracking and segmentation, as described further below.

State-of-the-art tracking algorithms only track an object in one single video sequence, thus remaining in the 2D image space. The 2D trajectories of the tracked object based on just the tracked 2D positions is depicted as lines with arrows 311*a,b* for object A and B, resulting in an expected 2D position 312*a,b* in the previous frame 301 where another tracking algorithm would start searching for the object.

In our case, the cameras are not expected to be fixed, thus, they can change their orientation and internal parameters (such as zoom) over time, resulting in a different view of the scene at the current time (frame 302) than previously (frame 301). When only taking into account the 2D positions resulting from another tracking algorithm, the tracking method's search would start at the same 2D positions 321*a,b* as shown in the previous frame 312*a,b*. Using the actual or extrapolated calibration data 131 from the calibration method 103 and the extrapolated 3D object position 130 from the 3D object position calculation method 107, the 2D positions of the projections of the extrapolated 3D projections into and positions 320*a,b* in the actual image are calculated. This does not only affect the 2D position of the object estimation but also the size or shape of the object in the video image. Thus, the tracking search step will start with an improved 2D position and shape estimation, resulting in a smaller search space which reduces the computational effort of the tracking method.

Another improvement of the tracking method is that objects entering or leaving the visible area of a camera can be detected easily if their 3D position is known. By projecting the extrapolated 3D object positions 130 of all objects into the 2D image, all 2D positions lying inside the frame boundaries must be considered during tracking. This can be done automatically by the method, or may be user-assisted, according to circumstances and available video information.

Figure 4:
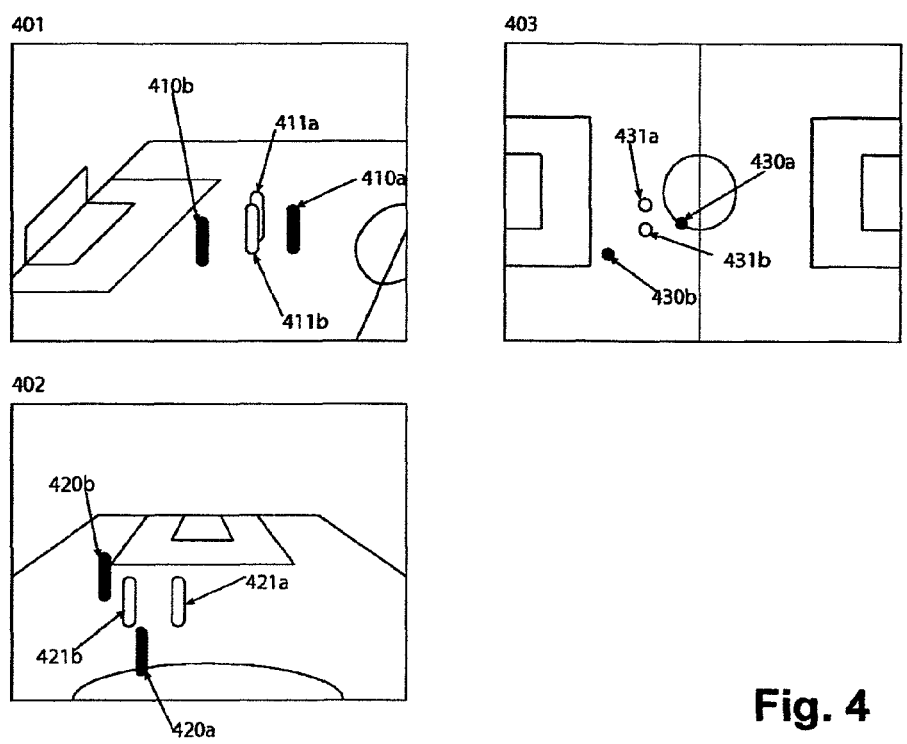
FIG. 4 schematically shows a situation wherein two (or more) objects collide as 2D projections in one camera's video images but not in another camera's.

Another improvement of the tracking method is the handling of collisions of objects in 2D image space as shown schematically in FIG. 4. In the schematic view of the scene 403, the 3D positions of the objects A,B are shown for a previous time t(k−1) 430*a,b* and for the current time t(k) 431*a,b*. The same situation can be seen in the view 401 from one camera with both objects 411*a,b* colliding in 2D, whereas the same situation from another camera view 402 shows no collision of the objects 421*a,b*. This leads to two additional types of information for the tracking method:
1. The tracking method can use the information that two or more objects collide in a certain view 401, and thus knows that there are two or more objects although only "one object" is recognizable from the 2D view alone.
2. The tracking method can easily keep track of the objects after a collision since it knows where the objects are located or are expected to be in 3D space and therefrom also in the 2D view, and thus will continue to track each object individually and correctly.

Finally, the tracking method determines 2D object position and shape 123 for all visible objects in all frames of all cameras, and provides them to object identification module 105.

Following the tracking method, the object identification method 105 associates, for each visible object in each video stream, the object's 2D position and shape in the color texture data 123 with a real object (e.g. players, goalkeepers, referees, ball, etc.) based on the camera calibration data 122, the information on the real-world objects 132 contained in a resource data module (or simply "resource") 110, and possibly also the extrapolated 3D object position 130 and the 2D position and shape 123 for essentially all objects in all frames of all cameras provided by the tracking method 104. Here and elsewhere, "all" stands for "essentially all", i.e. without defect or pathological or malfunctioning entities (objects, cameras).

In the course of the initialization for the frame at time t_init, the user associates each 2D position and shape information 123 of one camera with a specific real-world object 132 which all are known previously (player names, goalkeeper names, referees, ball, etc.) from the resource 110. For the other camera frames at time t_init, the object identification method preferably automatically suggests the identification (e.g. a name) by carrying out the following steps:

1. For all identified objects
   a. calculate an approximation of the 3D position (using the ground-level assumption as described in the 3D position calculation method 107) if no 3D position is available through extrapolation 130.
   b. Calculate a 2D position by projecting the said 3D position into each camera frame image using the calibration data 122.
   c. For all said 2D positions inside the frame boundary of the respective camera
      i. Determine the 2D position and shape information 123 that is located near this said 2D position.
      ii. If there is only one 2D position within some user-defined threshold regarding the distance, this 2D position and shape information 123 is associated with the real-world object associated with said identified object.
      iii. If there are more than one 2D positions within said threshold, present to the user a list sorted by distance from which he can actively select the second or more distant one by hand. In case of no action by the user, the first one remains selected. Associate the corresponding 2D position and shape information 123 with the real-world object associated with said selected object.
   d. For all 2D positions and shapes of each camera which have not been associated with a real-world object in one of the previous steps, determine a list of possible candidates by
      i. Eliminating those real-world objects which are already associated with a 2D position and shape information 123 in said camera frame.
      ii. Ordering the remaining candidates by increasing distance of the 2D-projection of their 3D position into the image (as in 1b).
      iii. Objects whose 3D position is not calculable yet are placed in the front or back of the list, depending on a user setting.
      iv. For all subsequent frames, the object identification method carries out the following steps:

If the 2D object position and shape information 123 has already been identified and associated in the previous frame, use the according information 132 again.

If the 2D object position and shape information 123 has not been identified in the previous step of the tracking method, carry out the same steps as during the initialization frame for unidentified objects.

If the 2D object position and shape information 123 still is not associated with a real-world object information 132, mark the frames as requiring user-interaction.

For all frames, where an non-ambiguous identification of all 2D object position and shape information 123 provided by the tracking method 104 has been found, mark said frame as done and not requiring further user interaction.

The user then manually associates the 2D object position and shape information 123 in all frames marked as requiring user interaction using the lists of possible candidates until all frames contain a non-ambiguous identification of all 2D object positions and shape information 123.

The object identification method 105 results in a 2D object position and shape and object identification 124 for all 2D object positions and shapes found in the tracking method 104 in all frames of all video streams.

The data provided by the data acquisition 102 and the object identification 105, namely the color texture data 121 and the 2D object position and shape including the object identification 124 are the input into the object cutout method 106.

This method calculates a segmentation or cutout of the color texture data inside the area defined by the object's position and size between foreground (object) pixels and background pixels, a so-called alpha mask. Thus, one output of the object cutout method is the object texture data associated with an alpha mask 126.

Figure 5:
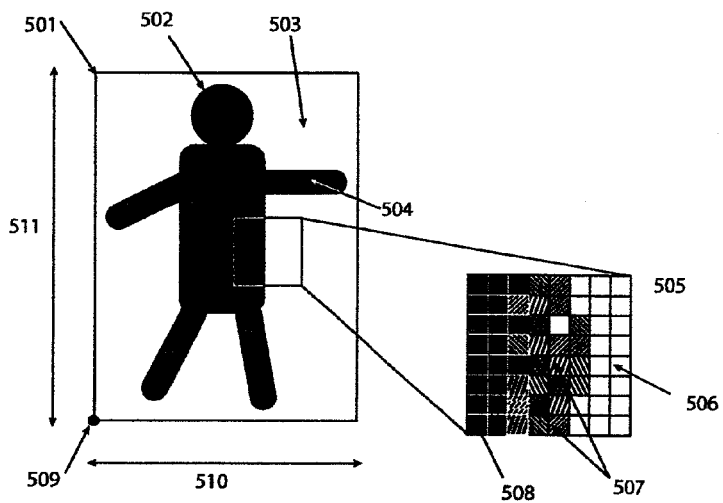
FIG. 5 schematically shows one embodiment of a 2D object position and size structure, a bounding box.

FIG. 5 schematically shows one embodiment of a 2D object position and size structure, in a bounding box 501. It also depicts the difference between foreground 502 and background 503 and the alpha mask values 505 resulting from the cutout or segmentation method.

If the bounding box 501 does not contain the entire object or intersects the bounding box, which bounding box 501 can either be assumed a-priori or be defined by a user, the bounding box can be enlarged by a certain size, either by the user, by a fixed value, or by an automatic procedure that analyzes the bounding box 501.

In this method, the objects are first categorized according to at least two categories. The categories are preferably based on statistical feature models, such as a histogram, a Gaussian mixture model, or similar models ("Pattern Classification", Duda, Hart, and Stork, Wiley Interscience, 2000). Preferable features include but are not restricted to color or edges. Prior to processing, the statistical model for all object categories is built using still images from one or more cameras and then applied to the video streams of all cameras. The statistical model is generated by, for each category of objects, the user moving, by means of a pointing device, a reference mark along a path over a variety of points that belong to said category. The features of the points on said path form a sample representing said category in the generation of the statistical model. For each category of objects, the reference mark labels points or picture elements (pixels) as belonging to the background or the foreground. The user marks background preferably for pixels outside the bounding box 501 and inside the bounding box 501 but in regions in which the background is actually visible. The user marks foreground for parts inside the bounding box in regions which belong to the foreground. Preferably, the model is generated using one or multiple input images 102.

Subsequently, the model is generated using appropriate methods for the used models, for example by k-means clustering or Expectation-Maximization methods, see "Pattern Classification", Duda, Hart, and Stork, Wiley Interscience, 2000. Preferably, the model is defined by a number of statistical parameters, for example by mean, variances or covariance matrices. The cutout is performed by processing all pixels in the bounding boxes using the parameters of the corresponding statistical model, taking into account:

1. Data similarity, i.e. measuring the accordance of the color of a data sample to the color models, by calculating likelihoods between model parameters and data samples.
2. Neighborhood or prior similarity, i.e. assessing the color differences between spatially and temporally adjacent samples. They penalize strong color deviations and ensure spatial and temporal coherence in the selection process.

For performing the cutout, the segmentation is preferably interpreted as a graph labeling problem yielding a solution using a min-cut method. For instance, a formulation and solution can be found in "An experimental comparison of min-cut/max-flow algorithms for energy minimization in vision", Boykov and Kolmogorov, IEEE Transactions on Pattern Analysis and Machine Intelligence 26, 9, 1124-1137, 2004. The result of the cutout is a binary segmentation (labels) of the bounding box 501 into foreground 504 and background 503, or 0 (background) and 1 (foreground).

Preferably, a post-processing method assigns alpha values 505 to all pixels in the vicinity of the boundary between foreground 508 and background 506 pixels, including pixels having intermediate values 507. These intermediate values express the smooth boundary of the object and can be calculated using for example "A Bayesian Approach to Digital Matting", Chuang, Curless, Salesin, and Szeliski., *IEEE Computer Vision and Pattern Recognition*, Vol. II, 264-271, 2001.

Using the alpha mask, the object's 2D position and shape are refined and provided as further output 127 of the object cutout method 106.

Figure 6:
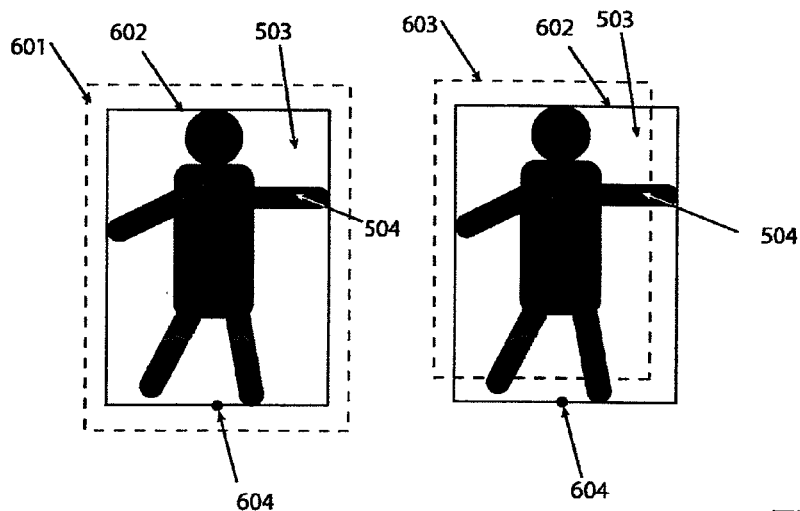
FIG. 6 schematically illustrates the refinement of the bounding box.

FIG. 6 schematically illustrates such a refinement of the bounding box. To this end, for each initially given bounding box 601 (dashed line) the alpha mask is traversed and the minimum and maximum values in both image dimensions (horizontal and vertical, or u,v) for which foreground pixels exist are calculated. This reduces the size of the bounding box 601 (solid line) and matches the shape of the actual object 602 better. The minimum then serves as the new position of the bounding box and the differences between maximum and minimum in each direction is taken as the new width (in u-direction) and height (in v-direction) of the bounding box. The reference or anchor point 604 for the 3D position calculation method is taken e.g. for the u-direction as being the middle point between the maximum and minimum and, in the v-direction, as being the minimum.

Finally, the method determines all foreground areas (some set of pixels) in the color texture data of the video streams 121 by traversing all objects in each video stream and marking the pixels that in the color texture data 121 are labelled as foreground with a flag. To get background texture data without the foreground objects and without holes, these areas are filled using an image inpainting method, see for example "View Interpolation for Image Synthesis", Chen and Williams, ACM SIGGRAPH 1993, pp. 279-288, which, for each hole-pixel at the border of a hole, subsequently selects the most similar patches from non-marked regions of the image and assigns the corresponding value to this border pixel, thus, filling the hole from the border to the middle. All these synthetically generated pixels are specially marked as being "inpainted", using a flag associated with the pixel, resulting in an further output of the cutout method which is a filled and flagged background texture data 125.

In summary, the output of the cutout module 106 comprises:
Filled and flagged background texture data 125;
Object texture and alpha mask per camera and real-world object, e.g. segmentation information 126; and
Refined object 2D position and shape with real-world object identification 127.

The 3D object position calculation method 107 uses the refined 2D position and size information with the real-world information 127 and the camera calibration data 122 of (all) the cameras to determine the 3D position of (all) the objects. The method carries out the following steps:

1. For each real-world object, the associated 2D position and shape information are collected.
2. For objects visible in no camera, the 3D position of previous steps (if available) is extrapolated using a one or higher order interpolation scheme.
3. For objects visible in just one camera, it is assumed that the object is located at ground level, thus, the vector from the camera position passing through the 2D position in the projected 2D image is intersected with the ground plane, resulting in the 3D position of the object.
4. For objects visible in two or more cameras, two different methods can be used:
   a. One assumes that all objects are located at the ground level, thus, the same method as described before is used, resulting in two or more 3D positions at ground level from which the mean or average is calculated as being the final 3D position of the object.
   b. The other method does not assume that the objects are located at the ground level and calculates the point of closest approach to the vectors using a standard technique, for example "Intersection of two lines in three-space", Goldman, In Andrew Glassner, editor, "Graphics Gems", page 304. Academic Press, 1990.

Thus, the 3D position calculation method 107 assigns each modeled object a 3D position for each time (video frame) and outputs these 3D positions of all objects 128. These can be accessed from other methods in later steps, wherein "later" is understood in the temporal sense—these steps may be "preceding steps" in the context of the structure of the system 100, to the effect that this access constitutes a feedback loop.

The interpolated image synthesis method 108 uses the information of the current frame 128,
the tracking method 104 preferably uses the extrapolated 3D object position information 130 from one or more previous frames and
the object identification method 105 preferably uses said information 130 for associating the 2D object position and shape information 123 with corresponding real-world object information 132.

The interpolated image synthesis method 108 generates the synthetic view of the scene. The inputs to this method are the 3D positions of the objects 128, the camera calibration data 122, the object texture and alpha masks 126, and the filled and flagged background texture data 125. Optionally, the inputs comprise 3D reconstruction data 135 of the environment, provided by the environment data module 113, and/or shapes of the objects.

The image synthesis method comprises the following steps:

1. Rendering the objects from a virtual view using a particular 3D representation of the scene and using the object textures 126 and either fixed alpha values (from the cutout step 106) or view-dependent alpha values, taking into account angular, resolution and field-of-view similarity. Preferably, texture mapping is achieved using projective texturing using the calibration data 122. Angular similarity penalizes views in which optical axis are farther away from the optical axis of the virtual view. Resolution similarity penalizes cameras which, for example, are farther away from the target geometry or have lower resolution in general. Field of view similarity penalizes data from camera views which do not see the target geometry of the virtual view.

2. Rendering the geometry of the background by alpha blending and depth buffering with the already rendered objects and by blending one or more hole-filled background textures 125 and taking into account the flagged data samples during blending. Preferably, texture mapping is achieved using projective texturing using the calibration data 122.

In step 1, the particular 3D representation preferably is one or more of billboards, height-field enhanced billboards, displacement-map enhanced billboards, or full 3D models of objects.

For step 2, the background geometry is modeled either by surfaces representing only the playing field (or pitch) or also including an environment representation such as a stadium model of more or less complexity. Thus, billboards, depth-map enhanced billboards or complete 3D models may be used for rendering.

Figure 11:
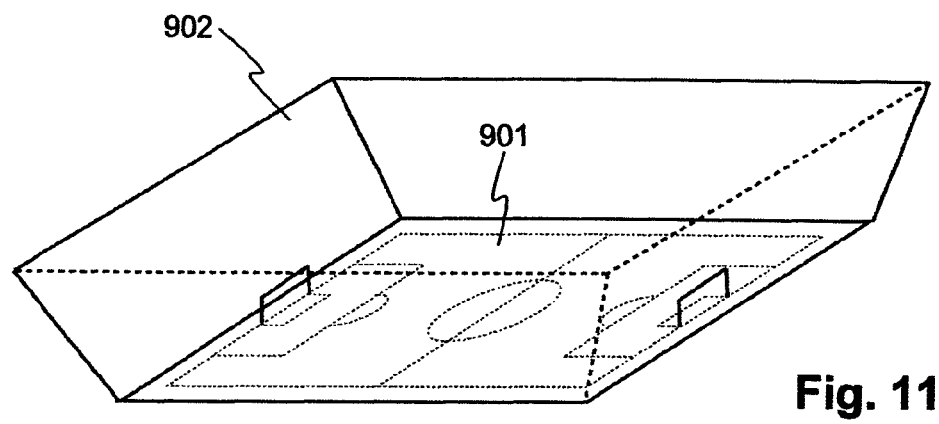
Figure 12:
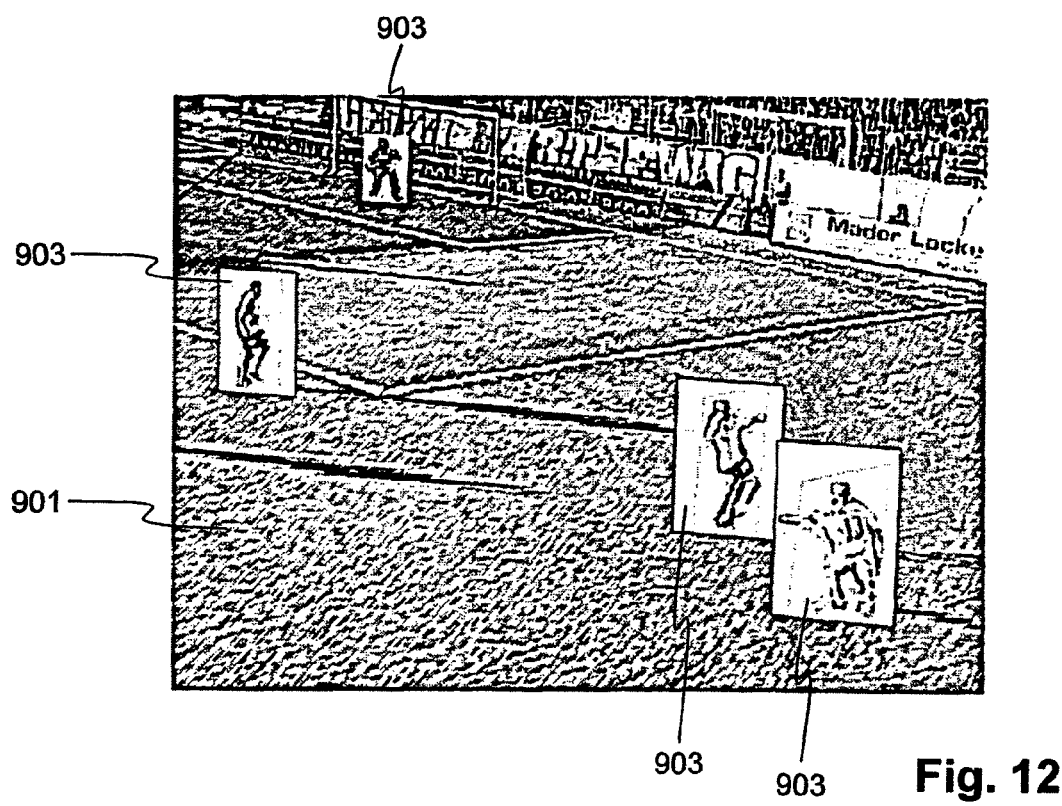
FIG. 12 shows a reconstructed image generated according to the invention.

FIG. 11 schematically shows a 3D environment model comprising a plane surface 901 representing the pitch, and further (inclined) surfaces 902 representing a stadium surrounding the pitch. FIG. 12 shows a reconstructed image generated according to the invention. Billboards 903, which ordinarily are not shown, are highlighted for illustration.

Taking into account the flagged data samples during blending means the following: in places where several views of the same background surface exists, and where in at least one view a surface patch is marked as being inpainted (i.e. synthetic data), and in at least one other view the same patch is marked as not being inpainted (i.e. real data), the synthetic data is ignored and only the real data is used. If real data from several sources is available, it may be blended, or data from only one source may be used.

In addition, arbitrary surfaces of the 3D scene may be coloured by rendering predetermined static or dynamic images onto them. The image synthesis 108 automatically generates a view showing said image(s) as if they were painted on the corresponding modelled surfaces. In this manner, user-determined data such as Logos, advertisement, sponsoring, interactive annotation, player statistics etc. are inserted in the 3D scene and projected into the synthetic 2D view.

Finally, the output of the interpolated image synthesis method 108, namely the synthesized interpolated video stream 129 is passed to the destination or consumer 109 after being transformed into a format convenient for the consumer, e.g. the standard SDI format as used for the input video streams 120.

Figure 7:
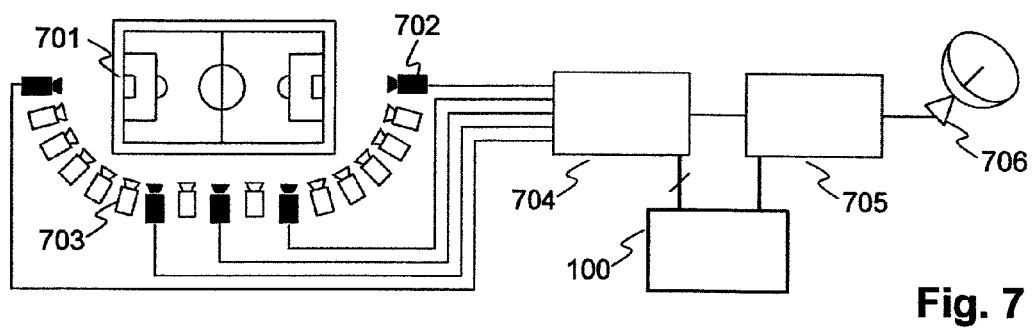
FIG. 7 shows a schematic overall view of the inventive system with peripheral devices.

FIG. 7 shows a schematic overall view of the inventive system 100 with peripheral devices, i.e. at least two real cameras 702 (drawn in black) arranged at a playing field 701, a control unit 704 of a content producer for collecting, managing and routing multiple video streams to a media distributing unit 705 connected to a broadcasting unit such as an antenna 706. The system 100 is arranged to receive at least two input video streams and to generate at least one output video stream. The output video stream may be provided to the distributing unit 705 as shown, or to the control unit 704. The system 100 generates views corresponding to virtual cameras 703 (drawn in outline) located at positions and orientations where no real camera exists.

Holefilling/Image Completion

Figure 8:
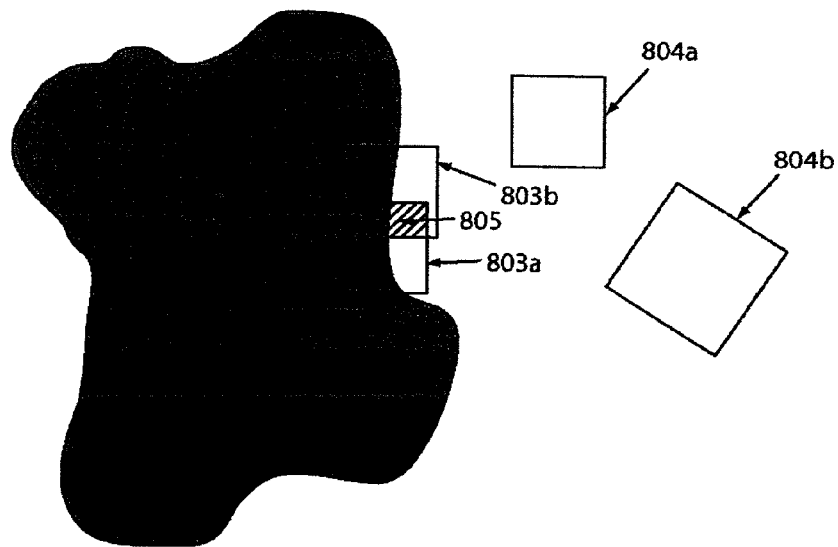
Figure 8:
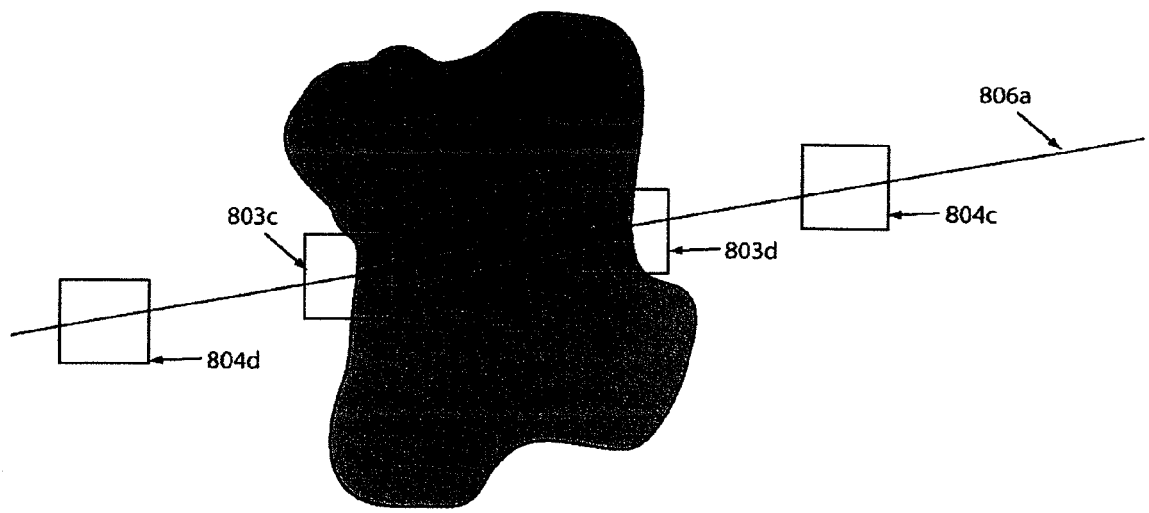

FIG. 8 schematically shows images with a hole to be filled and a hole with a landmark passing through. The images are of a background, and have been generated by segmenting the original image into a background part 801 with a known texture, also called "known area", and "unknown areas" or holes 802 in areas where objects have been identified and cut out of the background. In a preferred embodiment of the invention, the step of filling the holes 802 in the background preferably comprises the repeated application of the steps of Selecting a "destination patch" 803a, 803b, . . . whose area is partly known and partly unknown;

Selecting a "source patch" 804a, 804b, . . . which comprises at least one pixel with a known color value, i.e. from the known area 801;

Copying the image data (or texture) from the source patch to corresponding locations in the destination patch for those areas of the destination patch that are unknown, i.e. in the hole 802. As a result, the area of the hole 802 is reduced.

See for example "Fragment-based image completion", Drori, I., Cohen-Or, D., and Yeshurun, H., 2003. *ACM Trans. Graph.* 22, 3 (July 2003), pp. 303-312 or "Image completion with structure propagation", Sun, J., Yuan, L., Jia, J., and Shum, H., 2005, In *ACM SIGGRAPH* 2005 *Papers.* J. Marks, Ed. SIGGRAPH '05. ACM Press, New York, N.Y., pp. 861-868. Such patches are preferably of rectangular or circular shape. Preferably, multiple destination patches overlap each other 803a and 80b. In a preferred embodiment of the invention, overlapping destination patches are blended in the common region 805.

In a preferred embodiment of the steps of filling the holes in the background image, the destination patch 803a, 803b, . . . has the same size and orientation as the source patch 804a. Then, pixel information from the source patch can be copied directly. In another preferred embodiment, the source and destination patch have different size, shape, or orientation, as for patch 804b. In such cases, a function can be easily generated which maps the positions of the destination patch to positions of the source patches where one has to look up for the corresponding color values. Then, the copying may involve rotation and/or scaling of the source patch image (such as 804b).

In a preferred embodiment of the invention, the step of selecting a source patch 804a,804b, . . . comprises a comparison of potentially possible source patches with the destination patch 803a, 803b, . . . in order to find a source patch whose pixel values correspond to the known pixel values in the destination patch. By traversing the known regions of the destination patch, one can perform a pixel-wise comparison (resulting in the difference of the pixel-values) of all potentially matching source patches with the known region in order to find a good matching source patch. Preferably, one builds the sum of these differences in order to find an overall comparison value of the patches. The difference of the pixel values can be based on (but is not restricted to) the RGB, HSV or other color system values of the pixel.

In a preferred embodiment of the invention, the steps of filling the holes 802 in the known background 801 take into account the prior knowledge about the landmarks 806a, 806b, . . . on the background. Such landmarks are, for example, the lines and circles on a soccer pitch and are important for the correct perception and recognition of the scene.

Since the camera parameters are known from the camera calibration step, and the position of the landmarks is usually well defined in the regulations of the game, it is possible to project the landmarks from 3D space back into the video image. As a result, the 2D positions of the landmarks (e.g. lines or projected circles) in the video image are known. Using this knowledge, one can detect unknown regions (e.g. holes) on the projected landmarks by traversing all positions (i.e. pixels) related to a landmark and checking for the existence of a hole 802. For landmarks with identified unknown regions 807, recreating the missing parts of the landmarks can be performed separately before filling the remaining holes. For that, destination patches 803c, 803d are selected along the landmark to be completed. Preferably, the mid point of the patch always lies on the back-projected positions of the landmark into the image. Preferably, the source patches are then searched for along the known regions of the landmark 804c, 804d. Since the corresponding source patches will most probably show a similar structure, coloring and orientation of the landmark they contain, the landmark inside the hole can be recovered faster and at a better quality.

Repeated application of such source patches will then recreate an image of the landmark inside the hole. In this embodiment, the size of the patches is preferably chosen to cover at least the maximal width of the landmark.

Figure 9:
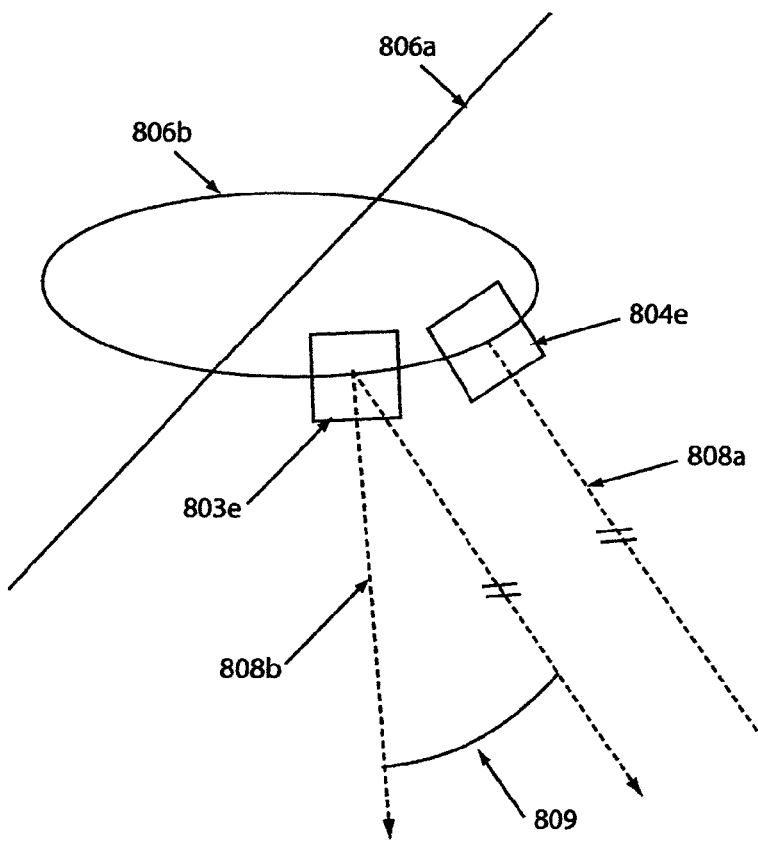
FIG. 9 schematically shows a projected circle and the rotation of patches.

FIG. 9 schematically shows a projected circle and the rotation of patches: In a preferred embodiment of the invention, the steps of filling the holes in the background using prior knowledge on the landmarks determines a rotation angle between the source patch 804e and the destination patch 803e when dealing with non-linear (i.e. not straight line) landmarks 806b, for example circles or the like. This rotation angle can be calculated from the angle 809 between the normals 808a, 808b (i.e. the line perpendicular to the landmark at a certain position) at the positions of the patches on the projected landmark. Before comparing the source patch with the destination patch, the rotation angle is integrated into the mapping function. Thus, a source patch from a distant part of the circle can be compared with and applied to the destination patch with a correct orientation, reducing the occurrence of visible artefacts in the result.

In a preferred embodiment of the invention, the search for source patches starts in the local neighbourhood of the destination patch before considering source patches at a larger distance. In this embodiment, one can define a threshold value that stops the search when a source patch is found whose matching value is smaller than the threshold—if "smaller" corresponds to a better matching. Thus, the algorithm will search only until a good (but maybe not the best) source patch is found.

In another preferred embodiment of the invention, the selection of the destination patches alternatingly switches between both sides of a hole if the hole is in between the endings of the landmark—for example on both sides of the hole, parts of the lines are visible. In this embodiment, the found source patches are applied alternatingly to destination patches on both sides 803c and 803d of the hole, filling it up or growing inwards from the boundary of the hole, along the length 10 of the landmark, until the middle of the hole is reached. Thus, the unknown pixels on both sides of the hole provide a better approximation to the known, surrounding pixels than a unidirectional filling would achieve on the distant side of the hole. The alternatingly applied patches' source patch can differ for each application step, or can remain the same for several of the alternating steps.

In further preferred embodiment of the invention, the pixels of the currently selected source patch are combined (e.g. blended) with the pixels of at least one of the last applied source patches before being applied to the current destination patch. The blending factor depends on the distance 801 from the actual destination patch 803c to the position where the last destination patch 803d has been. For example, if the distance 801 is large, then the source patch is not altered before being applied. However, when the distance is small, the source patch is altered such that it looks similar to the last destination patch nearby. Thus, the current destination patch will have a decreasing pixel-wise difference from other destination patches with decreasing distance, which leads to a seamless overlap in the middle of the hole.

Figure 10:
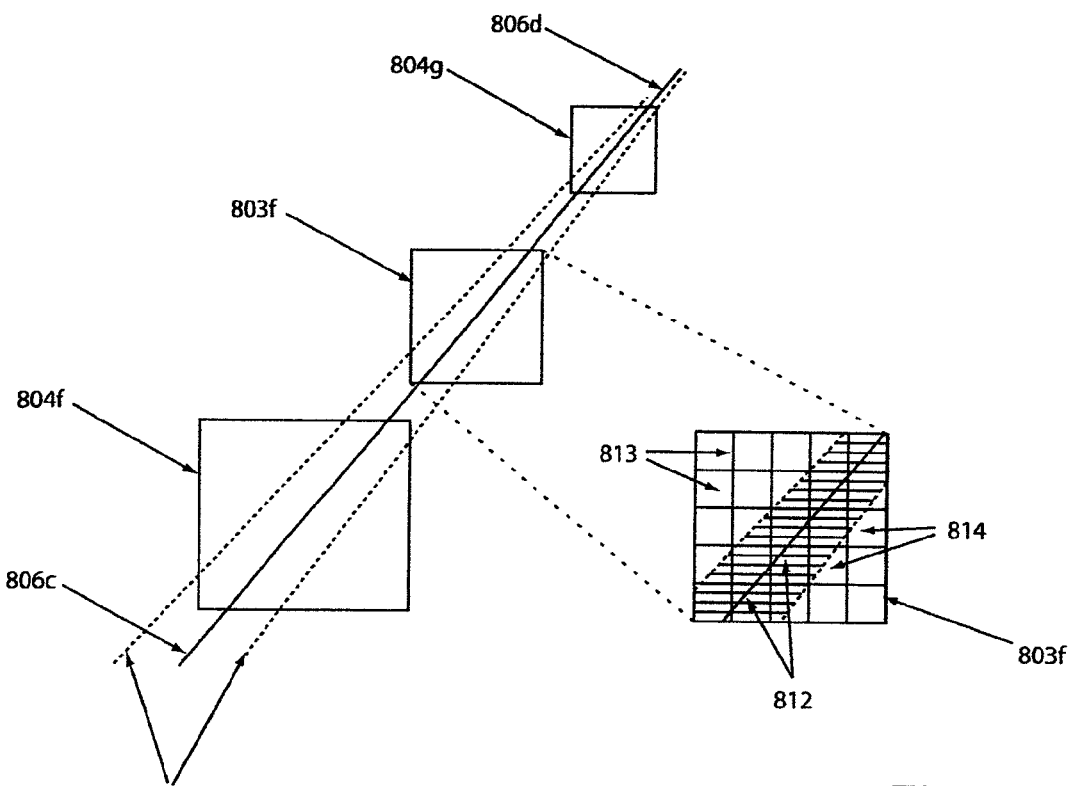
FIG. 10 schematically shows a perspective projection of a landmark and the pixel-wise assignment for a landmark FIG. 11 schematically shows a 3D environment model.

FIG. 10 schematically shows a perspective projection of a straight line landmark and the pixel-wise assignment for a landmark: A further preferred embodiment of the invention uses the known camera parameters in order to determine a scaling factor integrated into the mapping function from the source patch pixels to the destination patch pixels (and vice versa). A landmark starting at a point 806c relatively close to the camera and ending in a distant point 806d leads to a projection of the landmark which requires larger source patches corresponding to positions near the camera 804f than source patches corresponding to positions far away 804g due to the perspective projection. Using projective geometry calculations, the scaling factor between a source patch 804f, 804g and a destination patch 803f is determined and applied during the comparison and application of the patches. Preferably, this scaling factor is used also when choosing the size of the source and destination patch, respectively.

In a further preferred embodiment of the invention, the landmarks are not considered as lines or one-dimensional elements, e.g. points, straight lines or circles, but also associated with an additional dimension perpendicular to the main orientation, such as the width of a line. The width of the real landmark can be measured on site or easily assumed, based on experience. This results in a landmark being described by an area delimited by two borders 811 rather than just by a line or circle 806c. In the projection of the landmark into the image, pixels or, more general, parts of the image, can then be classified as belonging to the landmark 812, not belonging to the landmark 813 or partly belonging to the landmark 814. Preferably, the comparison function integrates this knowledge in order to provide an improved comparison of the patches. Also the application of the source patch onto the destination patch preferably integrates this knowledge.

In a preferred embodiment of the invention, the steps of recreating the landmarks involve a special treatment of areas where at least two landmarks intersect or join each other in a hole. Such regions should be regenerated in a different manner, since the application of patches as described above can lead to visual artefacts. Preferably, the regeneration of these areas is performed based on the classification of pixels on belonging to the landmark 812, not belonging to the landmark 813 or partly belonging to the landmark 814. Then, pixels belonging to the landmark in the source patch are compared and applied only if they map onto a pixel belonging to the landmark in the destination patch and vice versa. In other words, for those hole areas in which a landmark is expected, the patch matching algorithm only considers the pixels that are part of the landmark. Preferably, such an embodiment has a special treatment for combining pixels classified as partly belonging to the landmark, for example by blending or selection of the most probable one.

While the invention has been described in present preferred embodiments of the invention, it is distinctly understood that the invention is not limited thereto, but may be otherwise variously embodied and practised within the scope of the claims.

LIST OF DESIGNATIONS

101 The source (producer) of the at least two video streams (120)
102 Acquisition of the at least two video streams (120) into internal memory
103 Calibration method
104 Tracking method
105 Object identification method
106 Object cutout method
107 3D object position calculation method
108 Interpolated image synthesis method
109 The destination (consumer) of the resulting video stream(s)
110 A resource (file, database, etc.) that contains information (team, name, number, etc.) about all real-world objects (players, goalkeepers, referees, ball)
113 A resource (file, database, model, etc.) providing information about the environment (3D, CAD, etc.)
120 At least two isolated video streams
121 Color texture data
122 Camera calibration data
123 Object 2D position and shape
124 Object 2D position and shape and real-world object identification
125 Filled and flagged background texture data
126 Object texture and alpha mask per camera and real-world object, e.g. segmentation information
127 Refined object 2D position and shape with real-world object identification
128 Object 3D position
129 Synthesized interpolated video stream
130 The extrapolated Object 3D position
131 Actual or extrapolated camera calibration data
132 Information about a real-world object as stored in (110)
135 3D model, data or similar information on the environment
201 The first image of the video stream showing some features in perspective
202 A schematic view of the scene with its features
203a-d Marked features in the video image
204a-d Corresponding features in the schematic view
301 A frame of a video stream at time t−n (n>0)
302 A frame of a video stream at time t
303 A schematic view of the 3D situation of the scenes at various times
310a,b The 2D position of objects A,B in frame 301
311a,b The real and extrapolated trajectory of objects A,B
312a,b The extrapolated 2D position of objects A,B in frame 301 (image space)
320a,b The actual 2D positions of objects A,B in frame 302
321a,b The very same 2D positions as 312a,b in frame 302 (same image space location)
330a,b The known 3D position ob objects A,B at time t−2n
331a,b The known 3D position ob objects A,B at time t−n
332a,b The estimated 3D position ob objects A,B at time t
401 A camera view of a scene where two objects A,B collide in 2D
402 The same scene as in 401 viewed from another camera
403 A schematic view of the scene in 3D (from top)
410a,b 2D position of the objects A,B at time t0 in 401
411a,b 2D positions of the objects A,B at time t1 in 401
420a,b 2D positions of the objects A,B at time t0 in 402
421a,b 2D positions of the objects A,B at time t1 in 402
430a,b The 3D positions of the objects A,B at time t0
431a,b The 3D positions of the objects A,B at time t1
501 The bounding box
502 The object is completely inside the bounding box
503 Some part of the bounding box is background
504 Some part of the bounding box is foreground (belongs to the object)
505 A magnification of a boundary part between foreground and background consists of pixels
506 Some of these pixels can be classified as 100% background
507 Some of these pixels cannot be classified as 100% background or 100% foreground, but for example as 57% foreground
508 Some of these pixels can be classified as 100% foreground
509 The bounding box is defined by its position at the lower left corner . . .
510 . . . and its width . . .
511 . . . and its height
601 A bounding box provided by (123) and (124) is too large compared to the object's boundaries
602 The refined bounding box after the object cutout method (106)
603 A bounding box provided by (123) and (124) is intersecting the object's boundaries
604 The anchor point of the bounding box for the 3D position calculation method (107)
801 the known area of the image
802 the unknown area of the image, i.e. the hole
803a,b overlapping destination patches
803c,d destination patches on a landmark (806a) at both sides of the hole
804a a source patch
804b a source patch with different size and orientation
804c,d source patches on a landmark (806a)
805 the overlapping region of the destination patches
806a A projected line landmark
806b A projected circle landmark
806c A landmark with a width perpendicular to the direction of the landmark
807 The part of the landmark inside the hole
808a,b Normals of the projected circle landmark
809 Angle between two normals corresponding to patches
810 The length of the part of the landmark inside the hole
811 Boundaries of a landmark (806c) defined by the width
812 Pixels classified as belonging to the landmark (806c)
813 Pixels classified as not belonging to the landmark (806c)
814 Pixels classified as partly belonging to the landmark (806c)
901 Pitch, playing field
902 3D stadium model
903 Billboard

The invention claimed is:

1. A method for generating a 3D representation of a dynamically changing 3D scene including human players, comprising the steps of:
   a) acquiring at least two video streams from at least two cameras located at different locations, observing the same 3D scene, and outputting texture data of said at least two video streams for all frames, wherein each of the at least two cameras are side view cameras which do not look down at a surface of a playing field in a vertical direction;

b) determining camera parameters, which comprise the position, orientation and internal parameters, for said at least two cameras;

c) tracking the 2D movement of players and determining 2D shapes of the players in the at least two video streams based only on the texture data of said at least two video streams, wherein the 2D shapes of players is determined by evaluating the texture data and defining an area that includes at least one of a player's position and size;

d) determining the 3D position of the players by combining information from the at least two video streams to generate a 3D computational model of the 3D scene which includes data for rendering a synthesized view of the 3D scene from a virtual viewpoint that is distinct from viewpoints associated with the locations of the at least two cameras; and e) computing extrapolated 2D positions of the players in the at least two video streams from the 3D positions of the players;

wherein the step of tracking the 2D movement of the players in the at least two video streams and determining the 2D shapes of the players in the at least two video streams uses said computed extrapolated 2D positions of the players in the at least two video streams that stem from one or more earlier instants in time.

2. The method of claim 1, further comprising the step of:

f) determining the position and orientation of 3D rendering objects, each 3D rendering object being part of a computational model, the computational model comprising the 3D representation of the 3D scene, and each 3D rendering object corresponding to a player in the video stream, wherein the 3D rendering objects comprise surfaces on which image information from one or more video streams is rendered when generating the 3D representation of the scene.

3. The method of claim 1, wherein the step of computing extrapolated 2D positions of the players comprises:

computing extrapolated 3D positions of the players from the 3D positions of the players; and computing the extrapolated 2D positions of the players as projections of the extrapolated 3D positions of the players back into the at least two video streams.

4. The method of claim 1, further comprising the step of determining the identity of players in the at least two video streams using the extrapolated 2D positions of the players that stem from one or more earlier instants in time.

5. The method of claim 1, wherein reference features used for determining camera parameters, are features on the playing field and are identified in a video still image by a user:

pointing, with a graphical input device, to a representation of the same reference feature in a schematic representation of the playing field, and selecting said representation of the reference feature;

pointing, with a graphical input device, to a particular reference feature as seen in the video still image, and selecting said reference feature; and associating the identity of the representation of the reference feature with the reference feature seen in the still image.

6. The method of claim 5, wherein when selecting said reference feature in the video still image, determining the exact position of the reference feature in the video still image by the steps of:

automatically performing, in the vicinity of the position selected by the user, a feature extraction and in particular an extraction of lines, intersections and corners; and determining the position of the reference feature as being the position of one of the features extracted, and in particular of a feature whose type is the same as that selected in the schematic representation of the playing field.

7. The method of claim 1, wherein the step of tracking the 2D movement of players and determining 2D shapes of the players in the at least two video streams is implemented by a tracking function and comprises the step of incorporating dynamically changing camera parameters in the tracking function such that the tracking function compensates for changes in the camera parameters during tracking, wherein for each step of locating a particular tracked player in the at least two video streams, at least one of a player's expected position and size are corrected according to the known changes of the camera parameters.

8. The method of claim 7, wherein the camera parameters taken into account in the tracking function are camera parameters determined by a camera calibration step performed for the same video frame for which the tracking is done.

9. The method of claim 7, wherein the camera parameters taken into account in the tracking function are camera parameters determined by a camera calibration step performed for one or more previous video frames and are optionally extrapolated.

10. The method of claim 1, wherein the players are categorized as belonging to one of at least two categories, the categories preferably being based on a statistical model and comprising a first team and a second team.

11. The method of claim 1, comprising a segmentation step in which players are separated from the background, comprising the step of:

using alpha channel matching to assign, to each picture element, a value that expresses the probability with which the pixel is part of a player or part of the background.

12. The method of claim 1, comprising a segmentation step in which players are separated from a background, comprising the step of:

after removing the players, filling corresponding holes or unknown parts left in the background by image inpainting and marking such inpainted picture elements as being synthetic image data.

13. The method of claim 12, wherein the segmentation step comprises the step of refining the position and dimensions of bounding boxes around the players.

14. The method of claim 13, wherein the step of determining a background image as seen by the virtual camera further comprises:

rendering predetermined image data on the background model, superimposing it over or replacing the image information provided by the video streams.

15. The method of claim 12, wherein the step of filling holes in the background comprises the step of:

mapping image data that corresponds to source patches comprising real image data to destination patches comprising unknown parts of the image, thereby filling the holes; wherein the mapping involves a transformation of the patches according to their spatial relationship.

16. The method of claim 12, comprising the step of:

mapping image data that corresponds to source patches comprising real image data to destination patches comprising unknown parts of the image, thereby filling the holes; wherein the unknown part of the image is known to comprise a landmark feature, by choosing a destination patch to cover at least part of the landmark feature, and by searching the known image for a matching source patch along the landmark.

17. The method of claim 16, comprising the step of:
for filling a hole comprising a section of a circular landmark, mapping the destination patch to the source patch and vice versa by transforming, preferably rotating scaling, these patches according to their location along the circular landmark.

18. The method of claim 16, comprising the step of:
for filling a hole comprising a section of a straight line landmark, mapping the destination patch to the source patch and vice versa by transforming, preferably scaling, these patches according to their location along the straight line landmark.

19. The method of claim 16, further comprising the step of:
associating a line landmark with a line width;
classifying image elements in source and/or destination patches as being part of the landmark or not, according to said line width;
when searching the known image for a matching source patch, and when copying a source patch, to a destination patch, only considering image elements that are part of the landmark.

20. The method of claim 1, further comprising providing a synthesized view from a virtual viewpoint that is distinct from the camera positions by the steps of:
providing camera parameters of a virtual camera;
determining a background image as seen by the virtual camera on a background model;
determining a projection of each of the players into the virtual camera and superimposing it on the background image; and
outputting the combined image for storage or for further processing.

21. The method of claim 20, wherein the step of determining a background image as seen by the virtual camera comprises the steps of:
blending, for each background picture element, image information from the different video streams that correspond to the same background location;
giving priority to image information that is not marked as being synthetic image data; and
rendering the image information on a background model comprising one or more surfaces representing the background.

22. The method of claim 21, wherein, in the background model, the surface representing the background is a surface representing the playing field or playing field, and optionally also comprises surfaces representing an 3D environment model.

23. The method of claim 20, wherein the step of determining a projection of each of the players into the virtual camera comprises the step of:
rendering the image information from one or more video streams onto 3D rendering objects placed in the 3D background model.

24. A data processing system for generating a 3D representation of a dynamically changing 3D scene, the system comprising:
a computer with a processor, memory, and input output devices, and the data processing system further comprising:
a) a data acquisition module acquiring at least two video streams from at least two cameras located at different locations, observing the same 3D scene, and outputting texture data of said at least two video streams for all frames, wherein each of the at least two cameras are side view cameras which do not look down at a surface of a playing field in a vertical direction;
b) a camera calibration module for determining camera parameters, which comprise the position, orientation and internal parameters, for said at least two cameras;
c) a 2D tracking module that is configured to track the 2D movement of players and determine 2D shapes of the players in the at least two video streams based only on the texture data of said at least two video streams by evaluating the texture data and defining an area that includes at least one of a player's position and size;
d) a 3D merging and 3D object position calculation module for determining the 3D position of the players by combining the information determined from the at least two video streams to generate a 3D computational model of the 3D scene which includes data for rendering a synthesized view of the 3D scene from a virtual viewpoint that is distinct from viewpoints associated with the locations of the at least two cameras; and
e) an extrapolation module for computing extrapolated 2D positions of the players in the at least two video streams from the 3D positions of the players;
wherein the 2D tracking module is configured to use extrapolated 2D positions of the players in the at least two video streams that stem from one or more earlier instants in time, and
wherein the computer comprises at least one of: the data acquisition module, the camera calibration module, the 2D tracking module, the 3D merging and 3D object position calculation module, and the extrapolation module.

25. The data processing system of claim 24, wherein the 3D merging and 3D object position calculation module is configured to provide the function of:
f) determining the position and orientation of 3D rendering objects, each 3D rendering object being part of a computational model, the computational model comprising the 3D representation of the 3D scene, and each 3D rendering object corresponding to a player in the video stream, wherein the 3D rendering objects comprise surfaces that serve to render image information from one or more video streams when generating the 3D representation of the scene.

26. The data processing system of claim 25, comprising a player cutout module for determining:
filled-in background texture data incorporating a flag that specifies whether a particular image patch or pixel is derived from real image data or was generated synthetically,
a player texture and alpha mask for each video stream and each object being tracked, and,
for each player being tracked, a player 2D position and shape and a real-world object identification.

27. The data processing system of claim 26, comprising:
an image synthesis module which provides, from the 3D position of the players, the filled-in background texture data and the player texture and alpha mask video data to a consumer.

* * * * *